(12) United States Patent
Saito et al.

(10) Patent No.: US 6,891,782 B1
(45) Date of Patent: May 10, 2005

(54) OPTICAL DISK RECORDING APPARATUS HAVING PUSH-PULL SIGNAL PROCESSING CIRCUIT, WOBBLE EXTRACTION CIRCUIT AND PRE-PIT DETECTION CIRCUIT

(75) Inventors: Minoru Saito, Hamamatsu (JP); Kazunobu Fujiwara, Hamamatsu (JP); Kazuhiko Honda, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 381 days.

(21) Appl. No.: 09/703,548

(22) Filed: Nov. 1, 2000

(30) Foreign Application Priority Data

Nov. 5, 1999 (JP) .......................................... 11-314568

(51) Int. Cl.[7] .............................................. G11B 7/00
(52) U.S. Cl. ............................. 369/44.29; 369/44.36; 369/47.25
(58) Field of Search ........................ 369/44.26, 44.13, 369/44.38, 44.39, 44.34, 44.35, 47.25, 53.11

(56) References Cited

U.S. PATENT DOCUMENTS 5,130,970 A * 7/1992 Ohta ....................... 369/44.38
5,508,991 A * 4/1996 Onigata et al. ........... 369/44.38
5,742,578 A    4/1998 Kumai et al.
6,487,149 B1 * 11/2002 Yokoi et al. .............. 369/44.38

FOREIGN PATENT DOCUMENTS

| EP | 0880132 A2 | 11/1998 | |
|----|------------|---------|---|
| JP | 9326122 | 12/1997 | |
| JP | 9-326122 | * 12/1997 | ................ 369/47.5 |

* cited by examiner

*Primary Examiner*—Nabil Hindi
(74) *Attorney, Agent, or Firm*—Pillsbury Winthrop LLP (57) ABSTRACT

Push-pull signal is created on the basis of reflected-light detection signals output from four divided light receiving elements that receive a reflection of a recording laser light beam off an optical disk. The push-pull signal is sent to a gain variation circuit. The push-pull signal is normalized by setting the gain of the gain variation circuit to a low level in response to a mark forming section of a recording signal, but to a high level in response to a blank forming section of the recording signal. Wobble detection and pre-pit detection are performed on the basis of the normalized push-pull signal.

7 Claims, 9 Drawing Sheets

OPTICAL DISK RECORDING APPARATUS HAVING PUSH-PULL SIGNAL PROCESSING CIRCUIT, WOBBLE EXTRACTION CIRCUIT AND PRE-PIT DETECTION CIRCUIT

BACKGROUND OF THE INVENTION

The present invention relates generally to optical disk recording apparatus for recording desired information onto an optical disk having wobbled recording tracks, and more particularly to an improved optical disk recording apparatus which permits high-accuracy wobble extraction, pre-pit detection, etc. during recording.

Recordable optical disks, such as recordable CDs like CD-R and CD-RW disks and recordable DVDs like DVD-R, DVD+RW, DVD-RAM and DVD-RW disks, have recording tracks wobbled in predetermined cycles. Generally, during recording, a wobble signal is extracted out of a push-pull signal generated by receiving a reflection of a recording laser light beam off the optical disk; specifically, the push-pull signal is indicative of a difference between outputs from light-receiving elements positioned symmetrically about the longitudinal direction of the recording track. Spindle motor control, reproduction of address information, generation of reference clock pulses for a recording signal, etc. are performed on the basis of the extracted wobble signal. Where the optical disk has pre-pits, i.e. marks previously formed intermittently along the recording track in a laterally displaced relation to the centerline of the track, a pre-pit signal (i.e., signal indicative of detected pre-pits) is extracted out of the push-pull signal, and generation of reference clock pulses for a recording signal, reproduction of address information, spindle motor control, etc. are performed on the basis of the extracted pre-pit signal.

During recording, the push-pull signal tends to vary significantly in level under the influence of modulation of the recording laser light beam with the recording signal. The wobble signal can normally be extracted by filtering the push-pull signal, but where the wobble signal and push-pull signal are of frequency bands considerably close to each other, a recording signal component can not be fully separated from the wobble signal by the filtering, so that the recording signal component would remain in the extracted wobble signal as a noise component, which would adversely influence the spindle motor control and the like. Further, the pre-pit signal occurs as a pulse-like projecting signal in the push-pull signal, and thus the pre-pits can be detected by comparing a changing level of the pre-pit signal with an appropriate threshold value. However, because the push-pull signal tends to vary in level under the influence of the modulation of the recording laser light beam with the recording signal, the peak level of the pre-pit signal would also vary. This makes it difficult to set the appropriate threshold value, which would result in erroneous detection of a pre-pit or result in a pre-pit being entirely omitted from detection.

SUMMARY OF THE INVENTION

In view of the foregoing, it is an object of the present invention to provide an optical disk recording apparatus which is capable of high-accuracy wobble extraction, pre-pit detection, etc. during recording on an optical disk.

In order to accomplish the above-mentioned object, the present invention provides an optical disk recording apparatus for recording information onto an optical disk having a wobbled recording track by irradiation of a recording light beam having power modulated in accordance with a recording signal, which comprises a push-pull signal processing circuit including: a push-pull signal generation circuit arranged to generate a push-pull signal on the basis of a reflected-light detection signal representative of a reflection of the recording light beam off the optical disk; and a gain variation circuit arranged to vary gain of either the reflected-light detection signal (i.e., signal before the push-pull signal creation) or the push-pull signal generated by the push-pull signal generation circuit in response to the modulation of the recording light beam, to thereby suppress a level variation of the push-pull signal that would be caused by the modulation of the recording light beam. With the arrangement that the gain of the reflected-light detection signal (i.e., signal before the push-pull signal creation) or the push-pull signal is varied in response to the modulation of the recording light beam, it is possible suppress a level variation of the push-pull signal that would undesirably result from the modulation of the recording light beam. Thus, the wobble signal component can be effectively prevented from varying in level due to the level variation of the recording light power, i.e. the wobble signal component can be normalized. As a consequence, wobble detection and pre-pit detection can be performed with greatly increased accuracy on the basis of the normalized push-pull signal. Preferably, the gain variation circuit varies the gain of the reflected-light detection signal or the push-pull signal between a mark forming section and a blank forming section of the recording signal. Further, the gain variation circuit may vary the gain, in response to the mark forming section of the recording signal, in accordance with a time-axial length of the mark forming section.

The optical disk recording apparatus further comprises a wobble extraction circuit including a filter circuit that is arranged to extract a wobble signal component out of an output signal of the push-pull signal processing circuit.

The optical disk recording apparatus further comprises a pre-pit detection circuit including a comparator that is arranged to compare an output signal of the push-pull signal processing circuit with a predetermined threshold value for detection of a pre-pit formed in the optical disk.

In a preferred implementation of the present invention, the pre-pit detection circuit includes: a first peak value detection circuit arranged to detect a peak value of the output signal of the push-pull signal processing circuit; a filter circuit arranged to extract the wobble signal component out of the output signal of the push-pull signal processing circuit; a second peak value detection circuit arranged to detect a peak value of an output signal of the filter circuit; and a threshold value setting circuit arranged to set, as the threshold value for use by the comparator, an optionally-selected value between the peak value detected by the first peak value detection circuit and the peak value detected by the second peak value detection circuit.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 2:
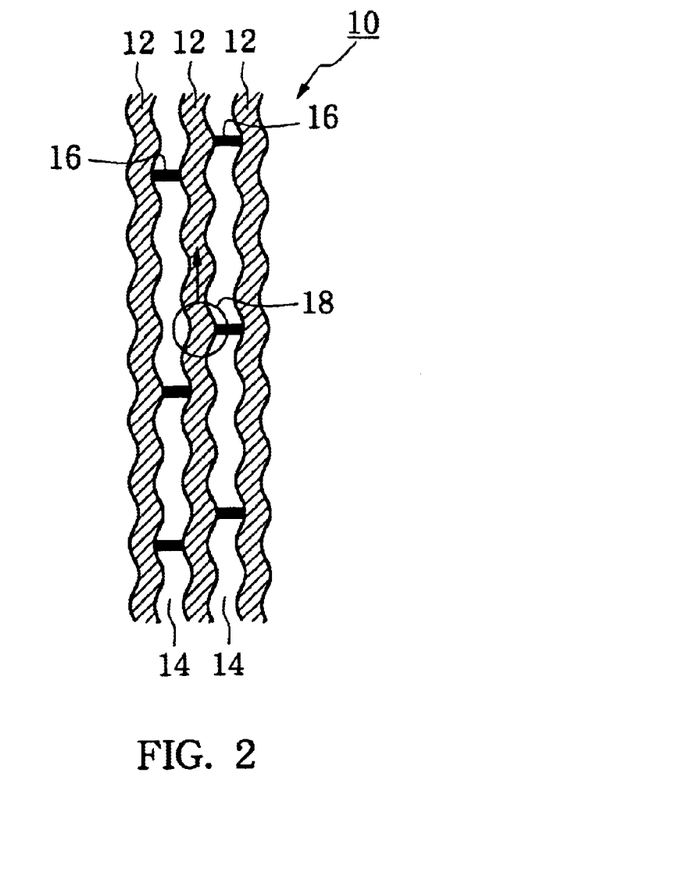
FIG. 2 is a plan view of a recordable optical disk for use with the optical disk recording apparatus, which is explanatory of a track construction of the optical disk.
Figure 3:
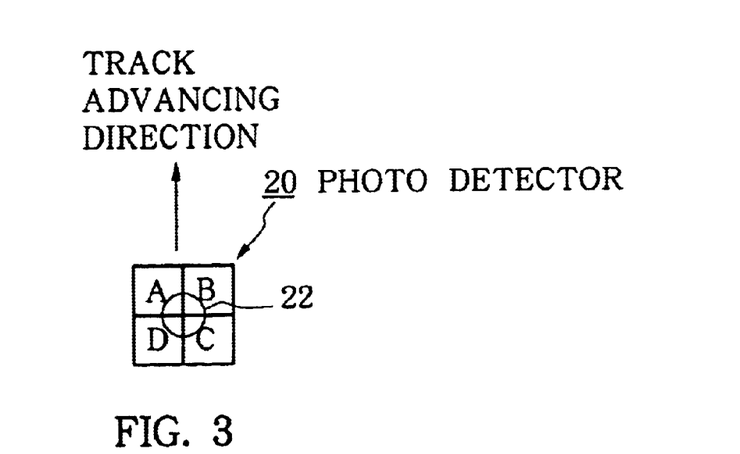
FIG. 3 is a plan view schematically showing exemplary construction of a photo detector for detecting a reflected light off the optical disk.

First, with reference to a schematic plan view of FIG. 2, a description will be made about an exemplary track construction of an optical disk on which information is recorded by an optical disk recording apparatus in accordance with the present invention. In the illustrated example of FIG. 2, the optical disk 10 is constructed as a DVD-R disk and has a plurality of grooves 12 as recording tracks wobbled in predetermined cycles. Each land 14 between adjoining grooves 12 has pre-pits 16, carrying address information and the like, previously formed therein in an intermittent fashion during manufacture of the optical disk 10. In the DVD-R disk like the optical disk 10 of FIG. 2, those pre-pits 16 formed in the land 14 adjacent the outer edge of the groove 12 are provided as pre-pits associated with that groove 12. Tracking control is performed on a spot 18 of a recording or reproducing laser light beam, emitted from an optical pickup (not shown), in such a manner that the spot 18 traces the groove or recording track 12 with the spot center accurately positioned on the centerline of the groove 12. When accurately positioned on the centerline of the groove 12, left and right side portions of the spot 18 cover respective side edge portions of two lands 14 adjoining the groove 12 so as to be irradiated onto the pre-pits 16 in the two lands 14 as well. Reflected light of the beam spot 18 off the optical disk 10 is received by a photo detector provided within the optical pickup, and tracking control, focus control, recorded information reproduction, etc. are performed on the basis of an output from the photo detector. Exemplary construction of the photo detector is schematically shown in a plan view of FIG. 3. This photo detector 20 comprises four divided light receiving elements such as PIN photo diodes, and the reflected light of the beam spot 18 off the optical disk 10 forms a beam spot 22 on the surface of the photo detector 20. In each of several embodiments to be described below, it is assumed that the divided light receiving elements or segments A, B, C and D of the photo detector 20 are arranged in the manner as shown in FIG. 3 relative to a track advancing direction. Push-pull signal is created or generated by evaluating a difference between summed reflected-light detection signals output from the left and right pairs of the segments A, D and B, C, i.e. "(A+D)−(B+C)".

Embodiment 1

Figure 1:
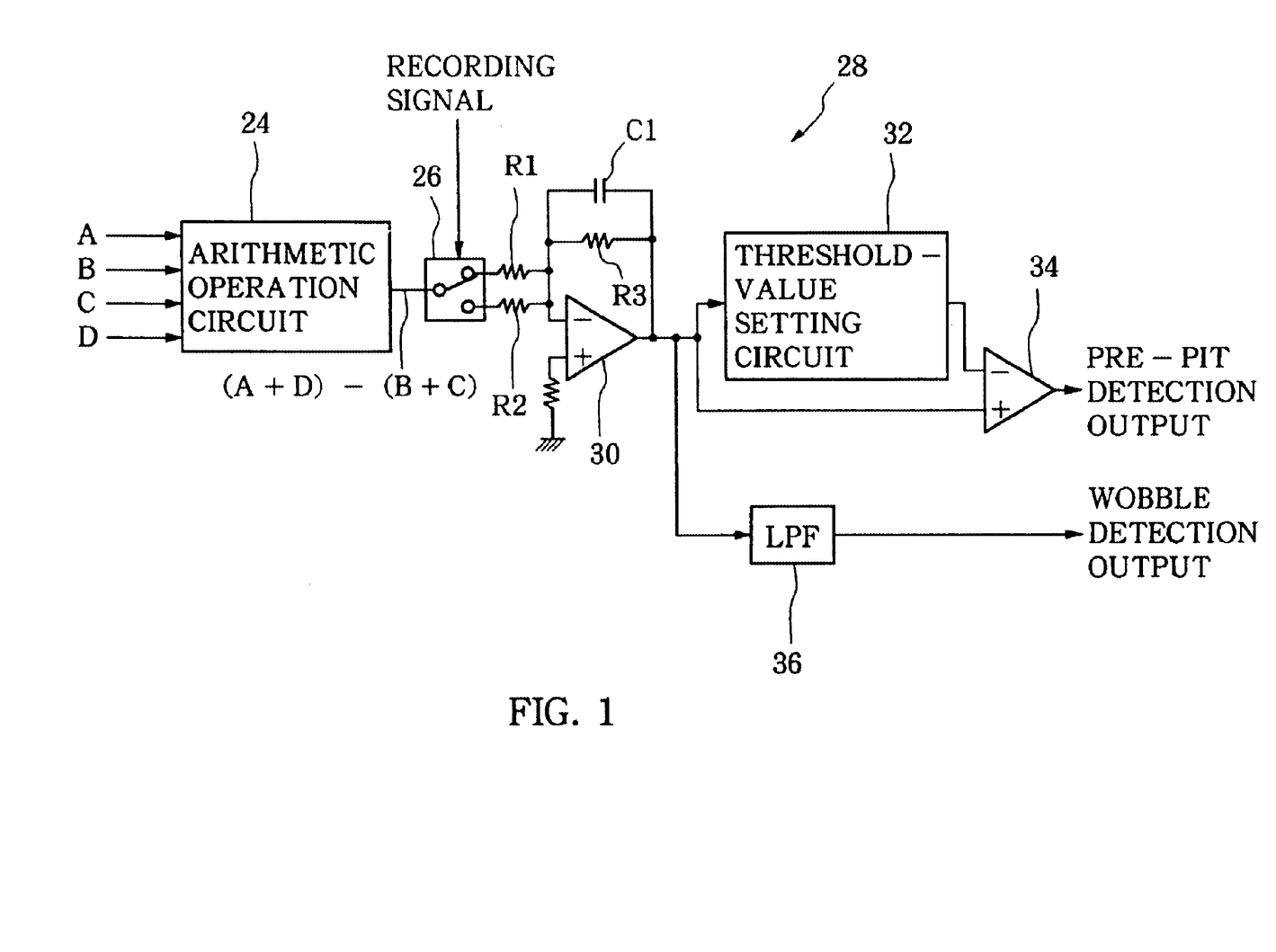
FIG. 1 is a circuit diagram showing principal circuitry of an optical disk recording apparatus in accordance with a first embodiment of the present invention.

FIG. 1 is a circuit diagram showing an optical disk recording apparatus in accordance with a first embodiment of the present invention, which is arranged to normalize a wobble signal component after creation or generation of the push-pull signal. Reflected-light detection signals A, B, C and D output from the four divided light receiving elements are subjected to arithmetic operations of "(A+D)−(B+C)" by an arithmetic operation circuit 24, to create a push-pull signal. The thus-created push-pull signal is sent via a switch circuit (analog switch) 26 to a gain variation circuit 28. The gain variation circuit 28 includes an inverted operational amplifier 30 with positive and negative (i.e., inverted) input terminals, and gain of the circuit 28 can be varied by the switch circuit 26 switching between resistors R1 and R2 both connected to the negative input terminal of the circuit 28. Capacitor C1 connected to another resistor R3 functions to remove high-frequency components unnecessary for pre-pit detection. Namely, the switch circuit 26 functions to switch between a first resistance value corresponding to a section in a recording signal for forming a mark (i.e., a mark forming section where a pit is formed by irradiation of a laser light beam of recording power) and a second resistance value corresponding to a section in the recording signal for forming a blank (i.e., a blank forming section where a blank is formed by irradiation of a laser light beam of reproducing power). Where the resistor R1 is provided for the mark forming section while the resistor R2 is provided for the blank forming section, the mark forming resistor R1 is set to the first resistance value and the blank forming resistor R2 is set to the second resistance value smaller than the first resistance value (i.e., R1>R2). Thus, the gain of the circuit 28 is variably controlled such that the gain for the mark forming section is smaller than the gain for the blank forming section. This arrangement can effectively suppress a level variation in the push-pull signal during recording due to a laser power variation between the mark forming section and the blank forming section, so that the wobble signal component can be normalized properly. Note that during reproduction, the pre-pit detection and wobble extraction are performed with the switch circuit 26 fixed to the blank forming resistor R2 of the lower resistance value.

The push-pull signal output from the gain variation circuit 28 is passed to a threshold-value setting circuit 32, which, on the basis of the push-pull signal, sets an appropriate threshold value to be used for detecting a pre-pit. Comparator 34 compares a changing level of the push-pull signal with the set threshold value and provides the result of the comparison as a pre-pit signal. The thus-provided pre-pit signal is delivered to various circuits for desired purposes such as generation of reference clock pulses for a recording signal, reproduction of address information, spindle motor control. The push-pull signal is also sent to a low-pass filter 36 for extraction of the wobble signal therefrom. The thus-extracted wobble signal is then delivered to various circuits for desired purposes such as spindle motor control, reproduction of address information and generation of reference clock pulses for a recording signal.

Figure 4:
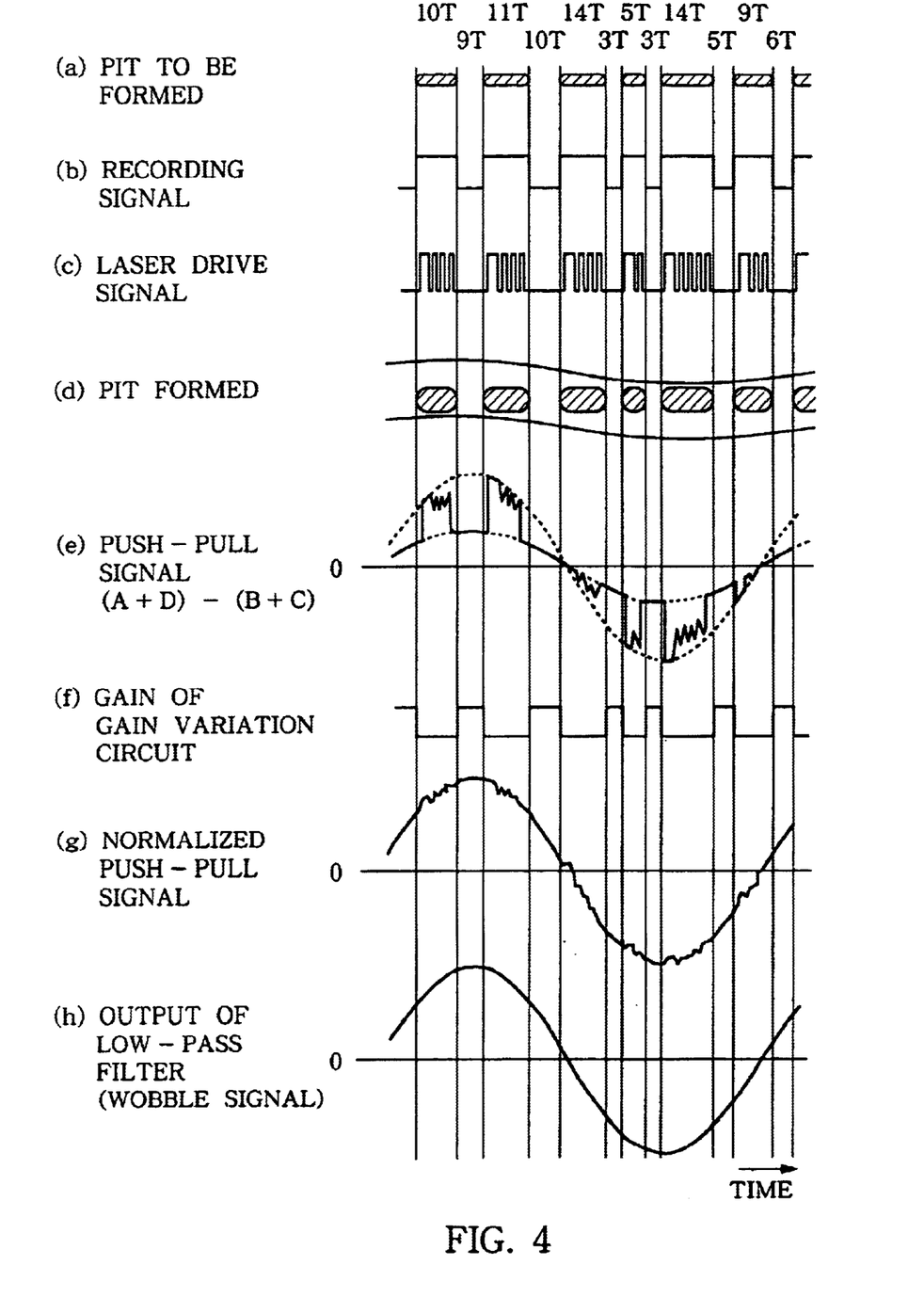
FIG. 4 is a waveform diagram explanatory of operation of the optical disk recording apparatus having the circuitry of FIG. 1.

Recording operation of the optical disk recording apparatus having the circuitry of FIG. 1 is explained here with reference to FIG. 4. Part (a) of FIG. 4 shows pits to be formed, and part (b) shows a waveform of a recording signal corresponding to the pits to be formed. As shown, the mark forming section and blank forming section alternate in the recording signal. Part (c) of FIG. 4 shows a waveform of a laser drive signal produced by inputting the recording signal of part (b) into a recording strategy circuit (or laser irradiation control circuit). The laser drive signal shown in part (c) is intended for DVD-R disks and comprises divided pulses having a same peak power level. The leading pulse in each pulse group in the laser drive signal, corresponding to one of the pits to be formed, has a greater pulse width than the succeeding pulses in the same pulse group, and the number of the succeeding pulses in the pulse group depends on the length of the pit to be formed. Part (d) of FIG. 4 shows pits having been actually formed in the groove 12 by irradiation of the recording laser light beam that is driven by the laser drive signal of part (c). Part (e) of FIG. 4 shows a waveform of a push-pull signal created by detecting the reflection of the recording laser light beam off the optical disk 10 as described above, and the thus-created push-pull signal contains a wobble signal component. Level of the push-pull signal varies in accordance with the laser power level; that is, the push-pull signal level increases in response to the mark forming section of the recording signal and decreases in response to the blank forming section. Part (f) shows a variation in the gain of the gain variation circuit 28, which, in accordance with the recording signal of part (b), is set at a low level in the mark forming section and at a high level in the blank forming section. Ratio between the gain levels in the mark forming section and in the blank forming section is set such that the wobble signal components in the mark forming section and blank forming section have a substantially equal envelope. Part (g) shows the push-pull signal output from the gain variation circuit 28, which has suppressed (or normalized) a level variation in the push-pull signal. Further, part (h) of FIG. 4 shows the wobble signal output from the low-pass filter 36.

Figure 5:
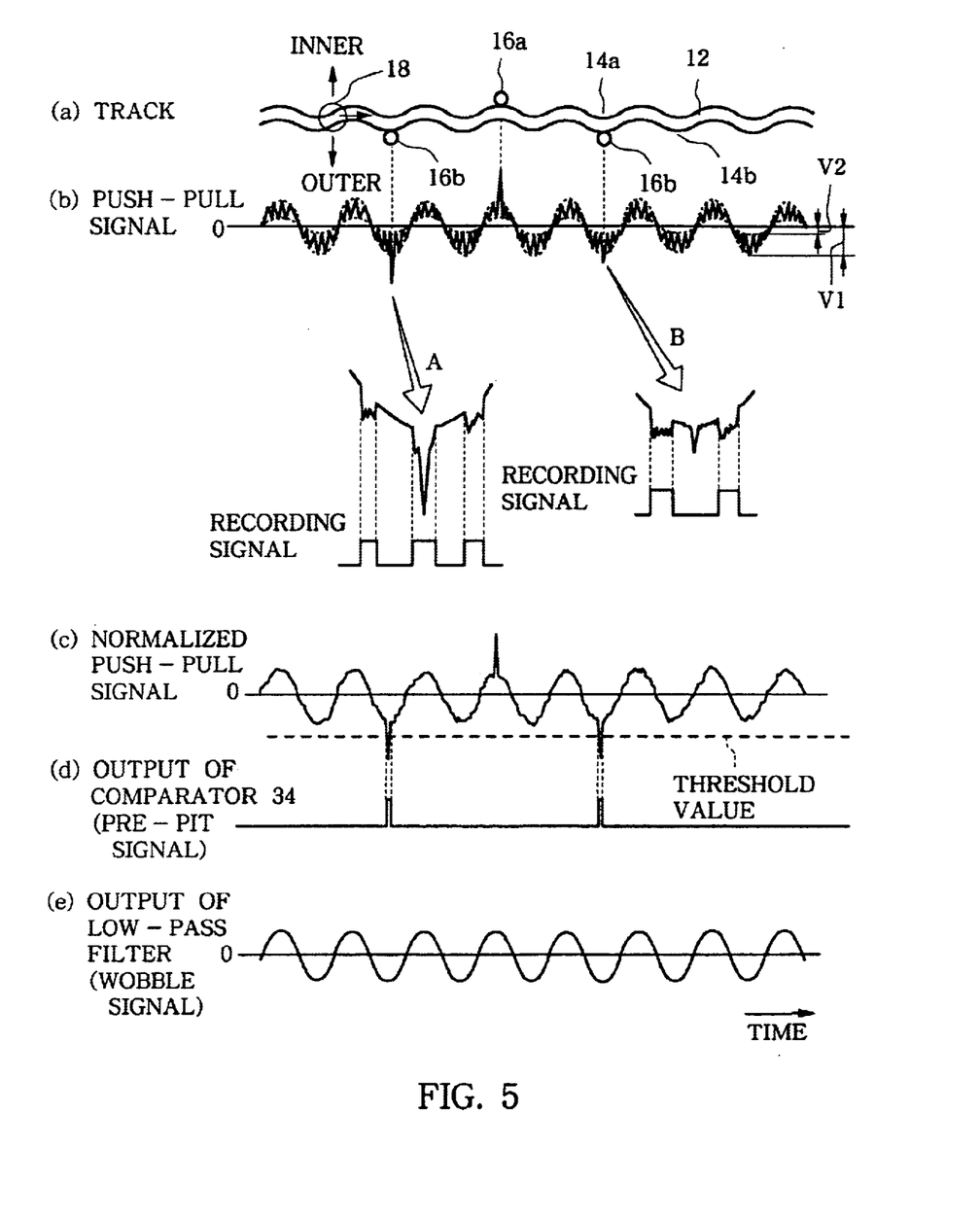
FIG. 5 is a waveform diagram explanatory of pre-pit detection and wobble extraction performed by the circuitry of FIG. 1.

The following paragraphs describe the pre-pit detection and wobble extraction performed by the circuitry of FIG. 1, with reference to FIG. 5. Let it be assumed here that desired information is recorded onto the optical disk 10 by the beam spot 18 tracing the groove 12 in a manner as shown in part (a) of FIG. 5. Note that arrangement of the groove and pre-pits shown in part (a) is only illustrative and differs from the actual arrangement on the DVD-R disk. Pre-pits 16a are formed in the land 14a adjacent the inner edge of the groove 12 (hereinafter called an "inner adjoining land 14a"), while pre-pits 16b are formed in the land 14b adjacent the outer edge of the groove 12 (hereinafter called an "outer adjoining land 14b"). The pre-pits 16b formed in the outer adjoining land 14b are pre-pits associated with the groove 12 in question. Part (b) of FIG. 5 shows a waveform of a push-pull signal provided during recording. Pulse-shaped waveform portion occurs as the recording laser light beam passes each pre-pit; such a pulse-shaped waveform portion appears near a peak in a waveform of a wobble signal component. Note that the pulse-shaped waveform portion occurring when the recording laser light beam passes the pre-pit in the inner adjoining land 14a presents an opposite polarity to the pulse-shaped waveform portion occurring as the recording laser light beam passes the pre-pit in the outer adjoining land 14b. The pulse-shaped waveform portion presents a higher peak value when the recording laser light beam passes the pre-pit in the mark forming section as denoted on an enlarged scale at "A" of part (b). Note that although the recording and reproducing power levels alternate even within the same mark forming section in the case of the divided pulses, the time intervals between the alternating recording and reproducing power are so short that the light beam never passes one pre-pit within one reproducing-power irradiating region in the mark forming section and thus the higher peak value never fails to occur. The pulse-shaped waveform portion presents a lower peak value when the recording laser light beam passes the pre-pit in the blank forming section as denoted on an enlarged scale at "B" of part (b). Therefore, if a high pre-pit-detecting threshold value is set in accordance with the higher peak value as denoted at "A" of part (b), the pre-pit in the blank forming section would not be detected successfully; conversely, if a low pre-pit-detecting threshold value is set in accordance with the lower peak value as denoted at "B" of part (b), small depression and the like, other the pre-pit, would also be detected. To avoid such inconveniences, the push-pull signal is normalized by the gain variation circuit 28 in the instant embodiment. If the level of the wobble signal component in the mark forming section is represented by V1 while the level of the wobble signal component in the blank forming section is represented by V2, the gain of the gain variation circuit 28 is set, for the blank forming section, to V1/V2 times that for the mark forming section; typically, the wobble signal component levels V1 and V2 are determined empirically at a designing stage of the optical disk recording apparatus.

Part (c) of FIG. 5 shows the push-pull signal having been normalized by the gain variation circuit 28 with the gain set in the above-mentioned manner. In the normalized push-pull signal, as shown here, the level variation has been suppressed and all pulse-shaped waveform portions occurring due to the presence of the pre-pits have been adjusted to a uniform peak value. Thus, by setting an appropriate threshold value as shown in part (c) and using the thus-set threshold value for comparison by the comparator 34, there can be provided a pre-pit signal indicative of the pre-pits in the outer adjoining land 16b. Further, by passing the normalized push-pull signal through the low-pass filter 36, there can be extracted a wobble signal free of the recording signal component as shown in part (e) of FIG. 5.

Figure 6:
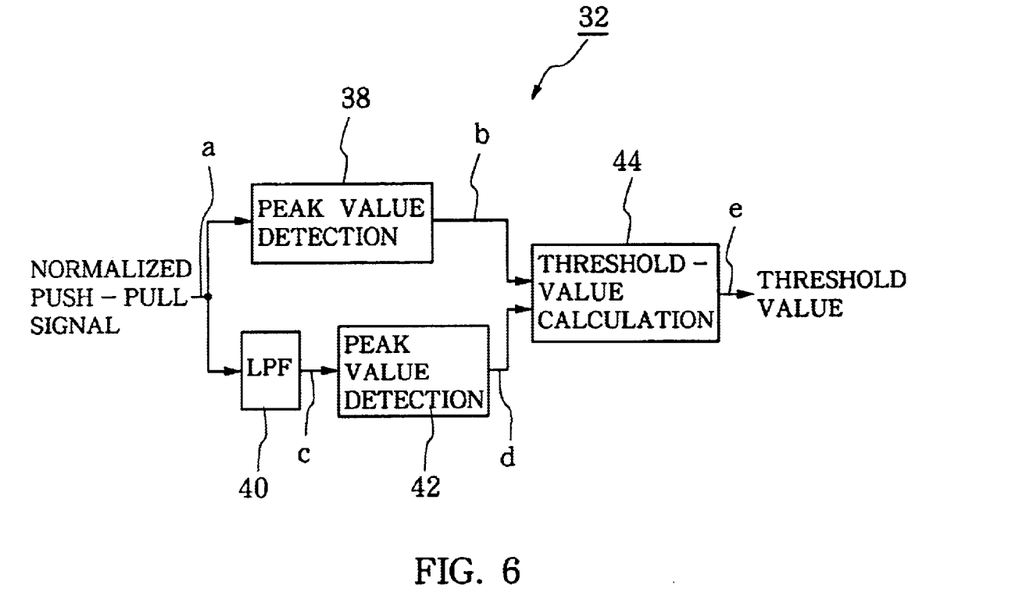
FIG. 6 is a block diagram showing exemplary details of a threshold-value setting circuit of FIG. 1.
Figure 7:
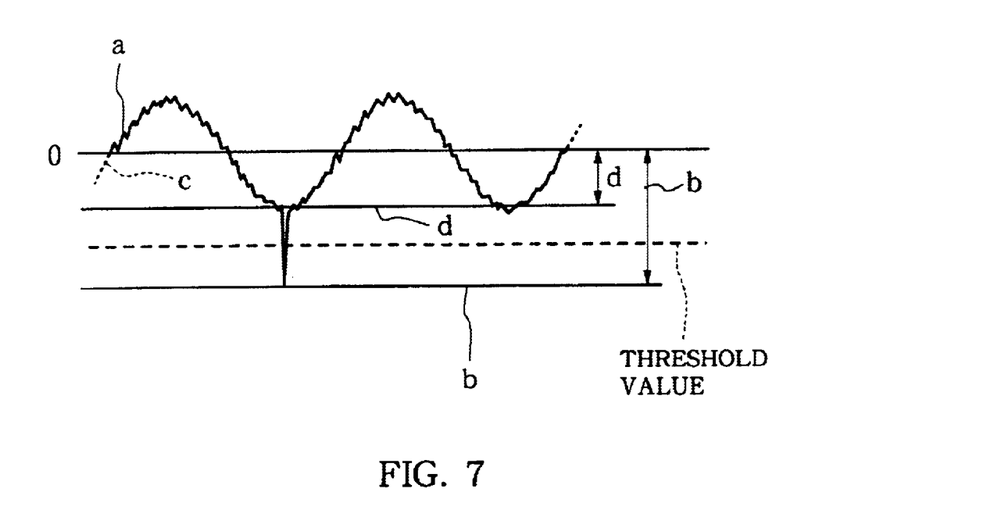
FIG. 7 is a waveform diagram explanatory of operation of the threshold-value setting circuit of FIG. 6.

FIG. 6 is a block diagram showing exemplary details of the threshold-value setting circuit 32 of FIG. 1. Waveforms appearing in various portions "a"–"e" of the threshold-value setting circuit 32 are also shown in FIG. 7 using the same reference characters. In FIG. 6, the normalized push-pull signal a output from the gain variation circuit 28 is introduced into a peak-value detection circuit 38, which detects a peak value b of one polarity, i.e., the polarity where the pulses due to the presence of the pre-pits in the outer adjoining land 14b appear. The peak value b corresponds to the peak value in the waveform of the pre-pit signal indicative of the pre-pits in the outer adjoining land 14b. The push-pull signal a from the gain variation circuit 28 is also introduced into a low-pass filter 40 that extracts a wobble signal component c out of the push-pull signal a, and the thus-extracted wobble signal component c is passed to a peak-value detection circuit 42 for detection of a peak value d of the same polarity. This peak value d corresponds to the peak value in the waveform of the wobble signal. Then, a threshold-value calculation circuit 44 determines, as the pre-pit-detecting threshold value, an appropriate value between the two peak values a and d, e.g. an average "(b+d)/2".

Embodiment 2

Figure 8:
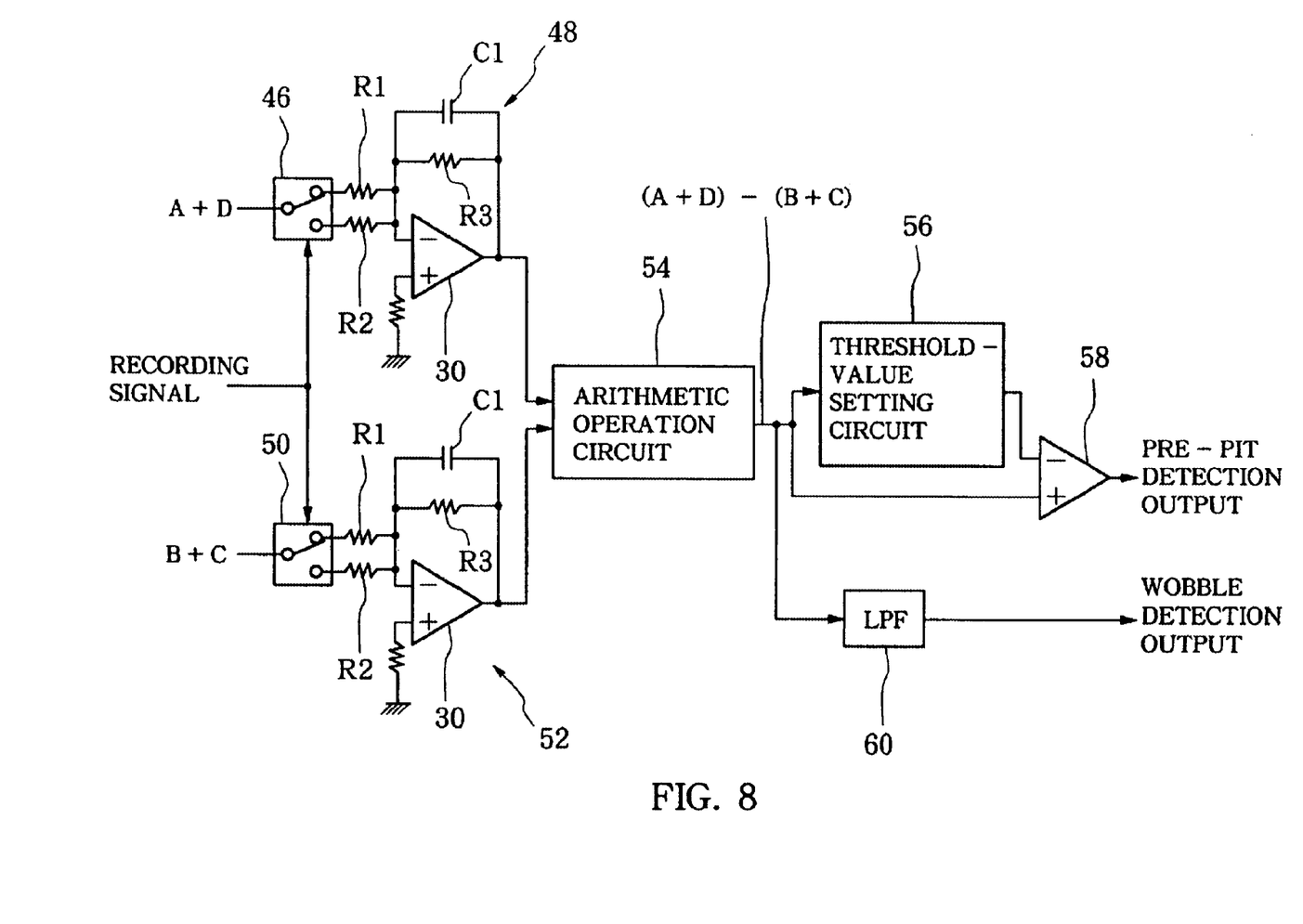
FIG. 8 is a circuit diagram showing principal circuitry of an optical disk recording apparatus in accordance with a second embodiment of the present invention.

In FIG. 8, there is shown an optical disk recording apparatus in accordance with a second embodiment of the present invention, which is arranged to normalize each of the summed reflected-light detection signals "A+D" and "B+C"

prior to creation of the push-pull signal. Namely, the summed reflected-light detection signal A+D is introduced via a switch circuit 46 into a gain variation circuit 48, while the other summed reflected-light detection signals B+C is introduced via a switch circuit 50 into a gain variation circuit 52. Similarly to the switch circuit 26 of FIG. 1, the switch circuits 46 and 50 each perform switching in response to the recording signal (see part (b) of FIG. 4). The gain variation circuits 48 and 52 are each constructed in generally the same manner as the gain variation circuit 28 of FIG. 1. The two summed reflected-light detection signals A+D and B+C having been normalized by the respective gain variation circuits 48 and 52 are sent to an arithmetic operation circuit 54, which performs an arithmetic operation of "(A+D)−(B+C)" to thereby provide a normalized push-pull signal similar to the output from the gain variation circuit 28 of FIG. 1. Then, the normalized push-pull signal is processed by succeeding circuits constructed in the same manner as those shown in FIG. 1. That is, pre-pits are detected from the normalized push-pull signal by means of a threshold-value setting circuit 56 and comparator 58, and a wobble signal is extracted from the normalized push-pull signal by means of a low-pass filter 60.

Embodiment 3

Figure 9:
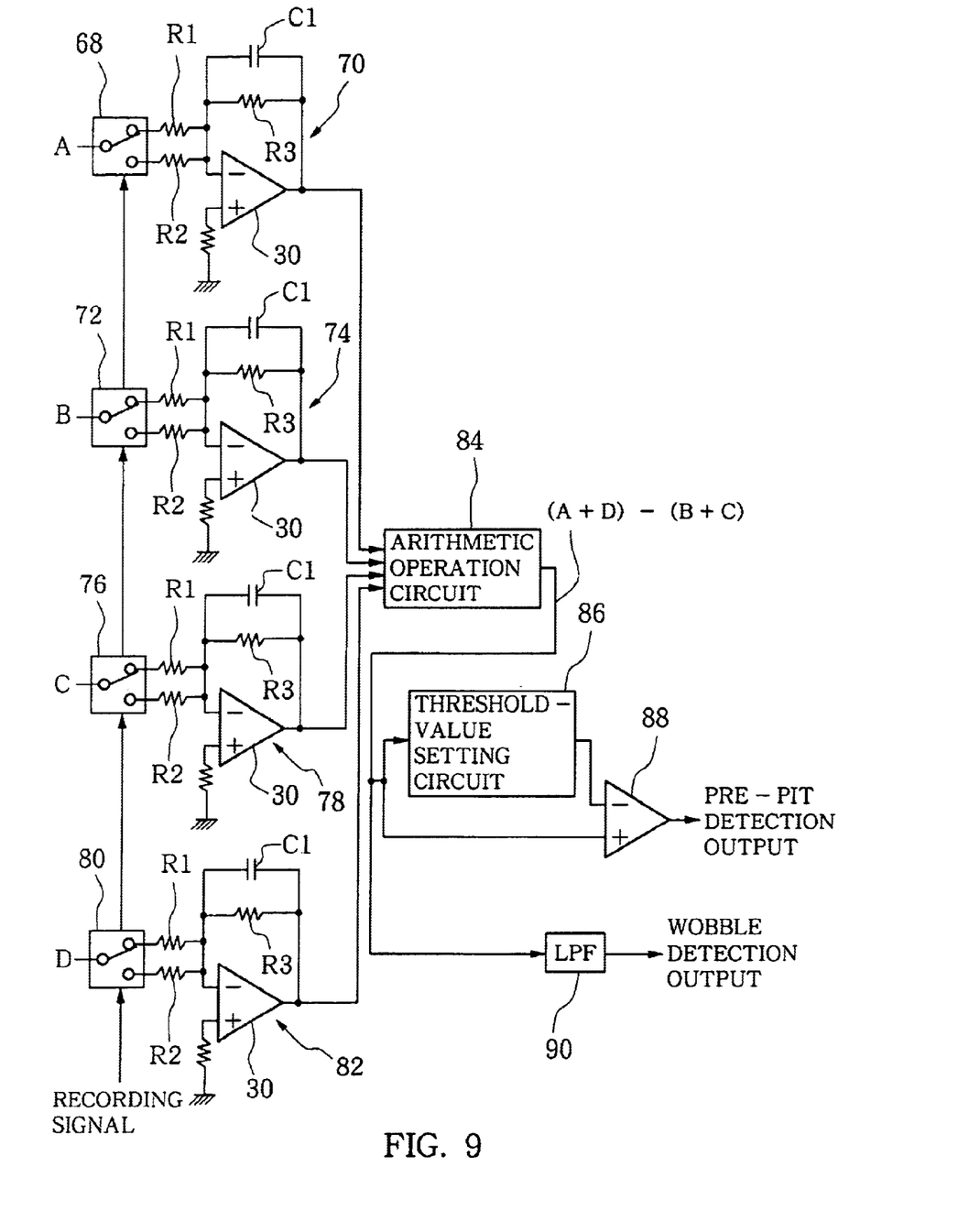
FIG. 9 is a circuit diagram showing principal circuitry of an optical disk recording apparatus in accordance with a third embodiment of the inventor.

In FIG. 9, there is shown an optical disk recording apparatus in accordance with a third embodiment of the present invention, which is arranged to normalize each individual reflected-light detection signal A, B, C and D before creation of the push-pull signal. Namely, the reflected-light detection signal A is introduced via a switch circuit 68 into a gain variation circuit 70, and the reflected-light detection signal B is introduced via a switch circuit 72 into a gain variation circuit 74. The reflected-light detection signal C is introduced via a switch circuit 76 into a gain variation circuit 78, and the reflected-light detection signal D is introduced via a switch circuit 80 into a gain variation circuit 82. Similarly to the switch circuit 26 of FIG. 1, the switch circuits 68, 72, 76 and 80 each perform switching in response to the recording signal (see part (b) of FIG. 4). The gain variation circuits 70, 74, 78 and 82 are each constructed in generally the same manner as the gain variation circuit 28 of FIG. 1. The reflected-light detection signals A, B, C and D having been normalized by the respective gain variation circuits 70, 74, 78 and 82 are sent to an arithmetic operation circuit 84, which performs an arithmetic operation of "(A+D)−(B+C)" to thereby provide a normalized push-pull signal similar to the output from the gain variation circuit 28 of FIG. 1. Then, the normalized push-pull signal is processed by succeeding circuits constructed in the same manner as those shown in FIG. 1. That is, pre-pits are detected from the normalized push-pull signal by means of a threshold-value setting circuit 86 and comparator 88, and a wobble signal is extracted from the normalized push-pull signal by means of a low-pass filter 90.

The above-described second and third embodiments of the present invention, respectively shown in FIGS. 8 and 9, are useful particularly in the following case. Due to some variations in the sensitivity of the PIN diodes, the reflected-light detection signals A, B, C and D tend to have different amplitude levels and also differ in amplitude level between the mark forming section and the blank forming section. To compensate for such the differences in the amplitude levels of the reflected-light detection signals A, B, C and D, the second embodiment of FIG. 8 can adjust a combination of the resistors R1, R2 and R3, by means of the gain variation circuits, for each of the summed reflected-light detection signals A+D and B+C, and the third embodiment of FIG. 9 can adjust a combination of the resistors R1, R2 and R3, by means of the gain variation circuits, for each of the reflected-light detection signals A, B, C and D; that is, the combination of the resistors R1, R2 and R3 need not always be the same. Thus, the second and third embodiments of FIGS. 8 and 9 can easily compensate for the differences in the amplitude levels of the reflected-light detection signals A, B, C and D, as compared to the first embodiment of FIG. 1.

Embodiment 4

Figure 10:
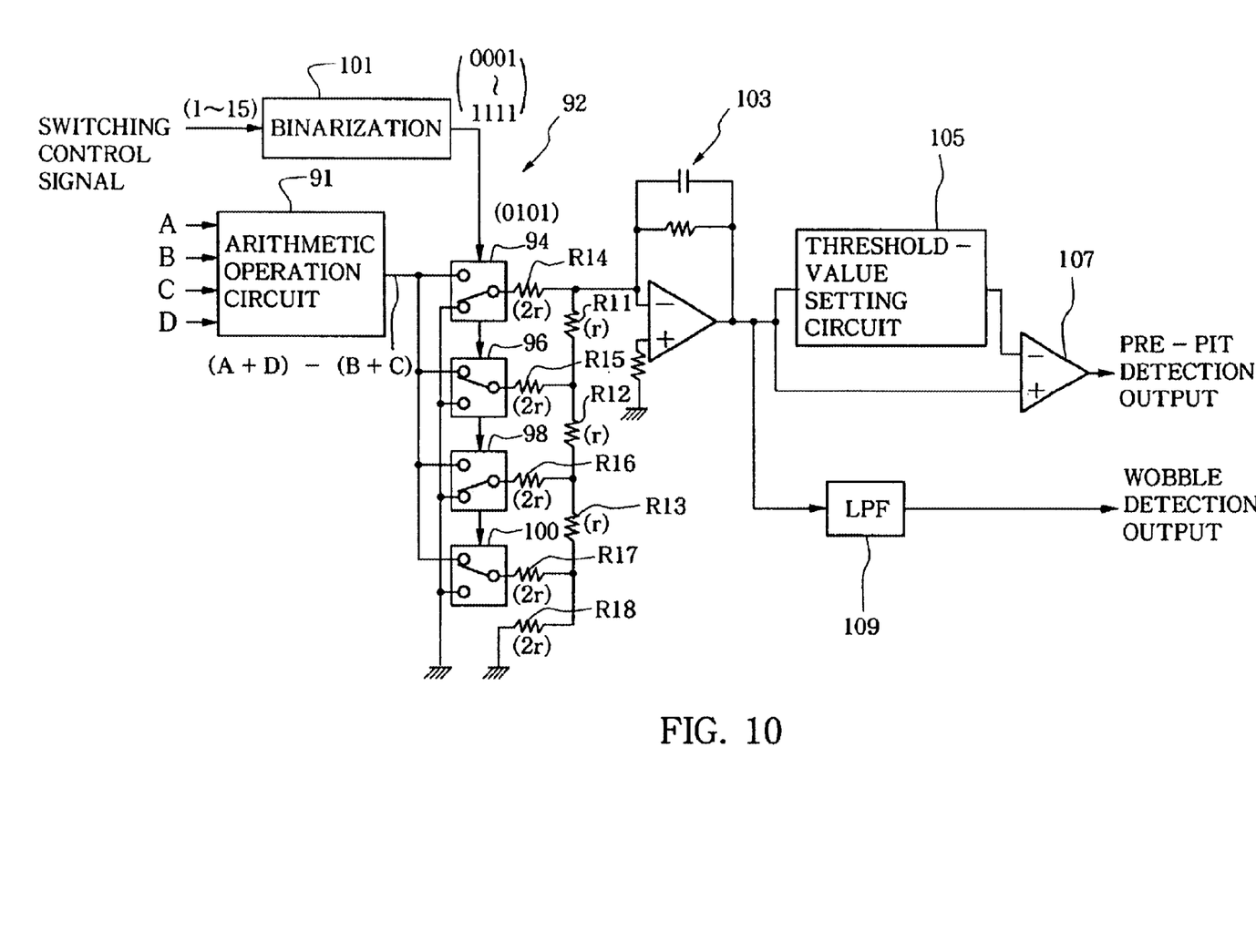
FIG. 10 is a circuit diagram showing principal circuitry of an optical disk recording apparatus in accordance with a fourth embodiment of the present invention.

Whereas each of the embodiments has been described above as switching the gain of the gain variation circuit between two levels, the present invention may also be arranged, as a fourth embodiment, to switch the gain of the gain variation circuit among three levels, for example, in a case where three or more different levels of the laser light power are used so that the level ratio of the wobble signal component in the reflected-light detection signal waveform varies among three or more different levels. FIG. 10 is a block diagram showing exemplary circuitry in the thus-arranged fourth embodiment, where the gain of the gain variation circuit is switched by use of ladder resistor circuitry. Namely, individual reflected-light detection signals A, B, C and D are given to an arithmetic operation circuit 91 that performs an arithmetic operation of "(A+D)−(B+C)" and passes the result of the arithmetic operation to the ladder resistor circuit 92. The ladder resistor circuitry 92 comprises a combination of resistors R11–R13 each having an appropriate resistance value r, resistors R14–R18 each having a resistance value 2r and switch circuits 94, 96, 98 and 100. Switching operation of the switch circuits 94, 96, 98 and 100 allows the overall resistance value in the circuitry 92 to be switched among 15 different levels. Switching control signal instructing the resistance value switching to any one of the 15 different levels is binarized via a binarization circuit 101, and the resultant binarized signal is delivered to the ladder resistor circuitry 92 to shift the individual switch circuits 94, 96, 98 and 100 to respective designated states so as to effect the switching to any one of the 15 levels. The ladder resistor circuitry 92 is coupled to a negative (inverted) input terminal of a gain variation circuit 103, so that the circuit 103 is varied in gain, by switching of the resistance value of the ladder resistor circuitry 92, to thereby normalize the push-pull signal. Then, the normalized push-pull signal is processed by succeeding circuits constructed in the same manner as those shown in FIG. 1. That is, pre-pits are detected from the normalized push-pull signal by means of a threshold-value setting circuit 105 and comparator 107, and a wobble signal is extracted from the normalized push-pull signal by means of a low-pass filter 109.

The following paragraphs describe examples of applications of the fourth embodiment shown in FIG. 10. Even with optical disks of the same standard, the level ratio of the wobble signal component in the push-pull signal would differ between the mark forming section and the blank forming section, for example, depending on a difference in the disk manufacturer and recording material used. Thus, such a value of the switching control signal as to provide optimum results is determined and stored in a memory, so that at the time of recording, an appropriate one of the values of the switching control signal, corresponding to an identified type of each optical disk inserted in the optical disk recording apparatus, is read out from the memory to set an appropriate gain level of the gain variation circuit.

Figure 11:
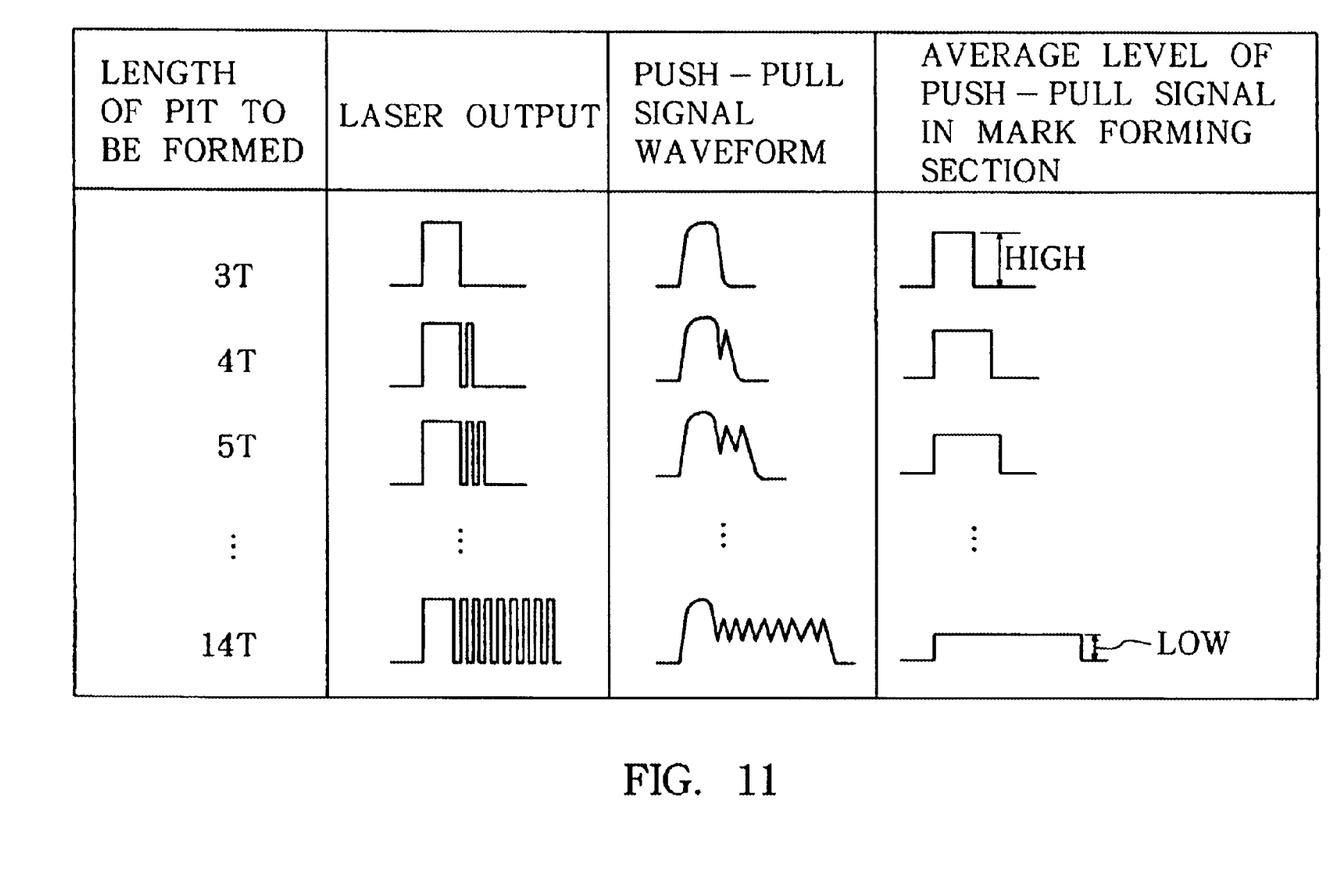
FIG. 11 is a diagram showing different push-pull signal waveforms corresponding to various lengths of pits.

Further, where the laser drive signal is in the form of divided pulses as shown in part (c) of FIG. 4, the leading pulse in each pulse group in the laser drive signal, corresponding to one of the pits to be formed, would have a greater level than the succeeding pulses in the same pulse group. If the leading pulses in the individual pulse groups have a substantially uniform level irrespective of the lengths of pits to be formed, then the push-pull signal in a given mark forming section will have a relatively high average level when the length of the pit to be formed is small, but will have a lower average level when the length of the pit to be formed is great, as seen from FIG. 11. Therefore, the push-pull signal can be normalized more accurately by switching the resistance value of the ladder resistor circuitry 92 in accordance with the length of the pit to be formed so that the gain of the gain variation circuit 103 decreases as the length of the pit decreases.

Whereas each of the embodiments has been described above as creating the push-pull signal from the reflected-light detection signals output from the four divided light-receiving elements of the photo detector, the push-pull signal may be created from reflected-light detection signals output from any other type of photo detector such as one having only two divided light-receiving elements. Further, although each of the embodiments has been described above as using a uniform gain level throughout one mark forming section, the present invention may be arranged to switch the gain level finely within the mark forming section in response to the divided pulses, such as by lowering the gain in response to a rising edge or falling edge of any of the pulses, or lowering the gain in response to the leading one of the pulses when the leading pulse is set to a high laser power level. Furthermore, although each of the embodiments has been described above as recording desired information by use of the divided pulses, the present invention can also be applied to recording using a non-divided pulse. Moreover, whereas each of the embodiments has been described above as recording desired information onto a DVD-R disk, the present invention can also be applied to recording onto any types of optical disks, other than the DVD-R type, which have wobbled recording tracks or a combination of wobbled recording tracks and pre-pits, in which case the electric circuitry of FIG. 1, 8, 9 or 16 may be used as necessary. Furthermore, whereas each of the embodiments has been described above as setting the resistance values of the resistors R1 and R2 such that the resistor R1 has a greater resistance value than the resistor R2 (i.e., R1>R2), the present invention is not so limited. For example, where recording is to be performed onto a phase-change optical disk, the laser power is sometimes shifted, in the blank forming section, to an erasing power level rather than the reproducing power level so that the output level of the push-pull signal may become greater in the blank forming section than in the mark forming section. In such a case, it may be more appropriate to set the resistance values of the resistors R1 and R2 such that the resistor R2 has a greater resistance value than the resistor R1 (i.e., R1<R2).

What is claimed is:

1. An optical disk recording apparatus for recording information onto an optical disk having a wobbled recording track by irradiation of a recording light beam having power modulated in accordance with a recording signal, said optical disk recording apparatus comprising a push-pull signal processing circuit including:

a push-pull signal generation circuit arranged to generate a push-pull signal based on a reflected-light detection signal representative of a reflection of the recording light beam off the optical disk; and a gain variation circuit arranged to vary gain of either the reflected-light detection signal in response to modulation of the recording light beam coming onto the optical disk, or the push-pull signal generated by said push-pull signal generation circuit in response to modulation of the recording light beam coming onto the optical disk, to thereby suppress a level variation of the push-pull signal caused by the modulation of the recording light beam coming onto the optical disk.

2. An optical disk recording apparatus as claimed in claim 1 wherein said gain variation circuit varies the gain of the reflected-light detection signal between a mark forming section and a blank forming section of the recording signal or the push-pull signal between a mark forming section and a blank forming section of the recording signal.

3. An optical disk recording apparatus for recording information onto an optical disk having a wobbled recording track by irradiation of a recording light beam having power modulated in accordance with a recording signal, said optical disk recording apparatus comprising a push-pull signal processing circuit including:

a push-pull signal generation circuit arranged to generate a push-pull signal based on a reflected-light detection signal representative of a reflection of the recording light beam off the optical disk; and a gain variation circuit arranged to vary gain of either the reflected-light detection signal in response to modulation of the recording light beam coming onto the optical disk, or the push-pull signal generated by said push-pull signal generation circuit in response to modulation of the recording light beam coming onto the optical disk, to thereby suppress a level variation of the push-pull signal caused by the modulation of the recording light beam coming onto the optical disk, wherein said gain variation circuit varies the gain of the reflected-light detection signal or the push-pull signal between a mark forming section and a blank forming section of the recording signal, and said gain variation circuit varies the gain, in response to the mark forming section of the recording signal, in accordance with a time-axial length of the mark forming section.

4. An optical disk recording apparatus as claimed in claim 1 which further comprises a wobble extraction circuit including a filter circuit arranged to extract a wobble signal component out of an output signal of said push-pull signal processing circuit.

5. An optical disk recording apparatus for recording information onto an optical disk having a wobbled recording track by irradation of a recording light beam having power modulated in accordance with a recording signal, said optical disk recording apparatus comprising a push-pull signal processing circuit including:

a push-pull signal generation circuit arranged to generate a push-pull signal based on a reflected -light detection signal representative of a reflection of the recording light beam off the optical disk; and a gain variation circuit arranged to vary gain of either the reflected-light detection signal in response to modulation of the recording light beam or the push-pull signal generated by said push-pull signal generation circuit in response to modulation of the recording light beam to thereby suppress a level of variation of the push-pull signal caused by the modulation of the recording light beam; and 6. An optical disk recording apparatus for recording information onto an optical disk having a wobbled recording track by irradiation of a recording light beam having power modulated in accordance with a recording signal, said optical disk recording apparatus comprising a push-pull signal processing circuit including:

a push-pull signal generation circuit arranged to generate a push-pull signal based on a reflected-light detection signal representative of a reflection of the recording light beam off the optical disk;

a gain variation circuit arranged to vary gain of either the reflected-light detection signal or the push-pull signal generated by said push-pull signal generation circuit in response to modulation of the recording light beam, to thereby suppress a level variation of the push-pull signal caused by the modulation of the recording light beam; and a pre-pit detection circuit including
    a comparator arranged to compare an output signal of said push-pull signal processing circuit with a predetermined threshold value for detection of a pre-pit formed in the optical disk,
    a first peak value detection circuit arranged to detect a peak value of the output signal of said push-pull signal processing circuit,
    a filter circuit arranged to extract a wobble signal component out of the output signal of said push-pull signal processing circuit,
    a second peak value detection circuit arranged to detect a peak value of an output signal of said filter circuit, and
    a threshold value setting circuit arranged to set, as the threshold value, an optionally-selected value between the peak value detected by said first peak value detection circuit and the peak value detected by said second peak value detection circuit.

7. An optical disk recording apparatus for recording information onto an optical disk having a wobbled recording track by irradiation of a recording light beam having power modulated in accordance with a recording signal, said optical disk recording apparatus comprising a push-pull signal processing circuit including:

a push-pull signal generation circuit arranged to generate a push-pull signal based on a reflected-light detection signal representative of a reflection of the recording light beam off the optical disk;

a gain variation circuit arranged to vary gain of either the reflected-light detection signal or the push-pull signal generated by said push-pull signal generation circuit in response to modulation of the recording light beam, to thereby suppress a level variation of the push-pull signal caused by the modulation of the recording light beam; and a pre-pit detection circuit including
    a comparator arranged to compare an output signal of said push-pull signal processing circuit with a predetermined threshold value for detection of a pre-pit formed in the optical disk,
    a first peak value detection circuit arranged to detect a peak value of the output signal of said push-pull signal processing circuit,
    a filter circuit arranged to extract a wobble signal component out of the output signal of said push-pull signal processing circuit,
    a second peak value detection circuit arranged to detect a peak value of an output signal of said filter circuit, and
    a threshold value setting circuit arranged to set, as the threshold value, an optionally-selected value between the peak value detected by said first peak value detection circuit and the peak value detected by said second peak value detection circuit.

* * * * *